United States Patent [19]

Mori et al.

[11] Patent Number: 4,996,541
[45] Date of Patent: Feb. 26, 1991

[54] FILM CONVEYING APPARATUS

[75] Inventors: Shinichi Mori; Akiyoshi Hamada; Mitsutoshi Yagoto; Masanori Murakami, all of Osaka, Japan

[73] Assignee: Minolta Camera Kabushiki Kaisha, Osaka, Japan

[21] Appl. No.: 510,577

[22] Filed: Apr. 18, 1990

[30] Foreign Application Priority Data

Apr. 19, 1989 [JP] Japan .................................. 1-99665
Apr. 19, 1989 [JP] Japan .................................. 1-99666

[51] Int. Cl.$^5$ .......................... G01D 15/14; B41J 2/47
[52] U.S. Cl. ..................................... 346/108; 226/44; 242/183
[58] Field of Search ................. 352/14, 159; 346/108; 226/44, 45; 242/183, 184

[56] References Cited

U.S. PATENT DOCUMENTS 4,229,083 10/1980 Wray ..................................... 352/14
4,814,793 3/1989 Hamada et al. ..................... 346/108
4,958,169 9/1990 Hamada et al. ..................... 346/108

Primary Examiner—Michael L. Gellner
Attorney, Agent, or Firm—Burns, Doane, Swecker & Mathis

[57] ABSTRACT

A film conveying apparatus includes a portion for feeding a film, a portion for drawing the film and a slack detecting apparatus for detecting slack of the film therebetween. The slack detecting apparatus includes a light emitting portion and the light receiving portion, and when the light from the light emitting portion to the light receiving portion is intercepted by the film, it is determined that the film has slack. When the slack of the film is detected by the slack detecting apparatus, emission of light from the light emitting portion is stopped for a prescribed time period.

15 Claims, 10 Drawing Sheets

FILM CONVEYING APPARATUS

BACKGROUND OF THE INVENTION

1. Field of the Invention

The present invention relates to a film conveying apparatus used in an image recording apparatus or the like and, more specifically, to a film conveying apparatus having an optical slack detecting apparatus.

2. Description of the Related Art

A conventional film conveying apparatus used in an image recording apparatus and the like employs a slack detector for detecting a slack of the film, and driving of the film conveying means is controlled by signals from the detector, in order to maintain appropriate slacking of the film. The film slack detector mainly comprises a light emitting apparatus such as a light emitting diode and a light receiving apparatus receiving light therefrom, and the slack of the film is detected by interception of light by the film.

In the film conveying apparatus, the slack detecting apparatus is almost always in operation so as to detect the slack of the film. Consequently, the light from the light emitting apparatus almost always irradiates the film. Although the light from the light emitting apparatus has a wavelength to which the film is not very sensitive, it is possible that the film is affected by the exposure for long period of time.

SUMMARY OF THE INVENTION

Therefore, one object of the present invention is to prevent bad influences to the film in a film conveying apparatus.

Another object of the present invention is to realize slack control of the film more properly in a film conveying apparatus.

A still further object of the present invention is to prevent bad influences to the film in a method of conveying the film.

The above described objects of the present invention can be attained by a film conveying apparatus of the present invention, comprising: a film feeding apparatus for feeding a film; a film drawing apparatus for drawing the fed film; a slack detecting apparatus having a light emitting element and a light receiving element for optically detecting slack of the film formed between the film feeding apparatus and the film drawing apparatus; and a controlling apparatus for stopping emission of light from the light emitting apparatus for a prescribed period, when slack of the film is detected by the slack detecting apparatus.

Since the film conveying apparatus comprises the above described components, emission of light from the light emitting element is stopped for a prescribed time period when the slack of the film is detected by the slack detecting apparatus. Continuous exposure of the film, which is not preferable to the film, is prevented. Consequently, a film conveying apparatus which does not affect the film can be provided.

In accordance with another aspect of the present invention, the method of conveying the film comprises the steps of: increasing speed of feeding of the film; detecting maximum amount of slack of the film; stopping emission of light of an optical apparatus; and reducing the speed of feeding the film.

Since the method of conveying the film comprises the above described steps, emission of light from an optical apparatus is stopped when the maximum amount of slack of the film is detected. Therefore, continuous exposure of the film, which is not preferable to the film, is prevented. Consequently, a film conveying method which does not affect the film can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

(1) First embodiment

Figure 1:
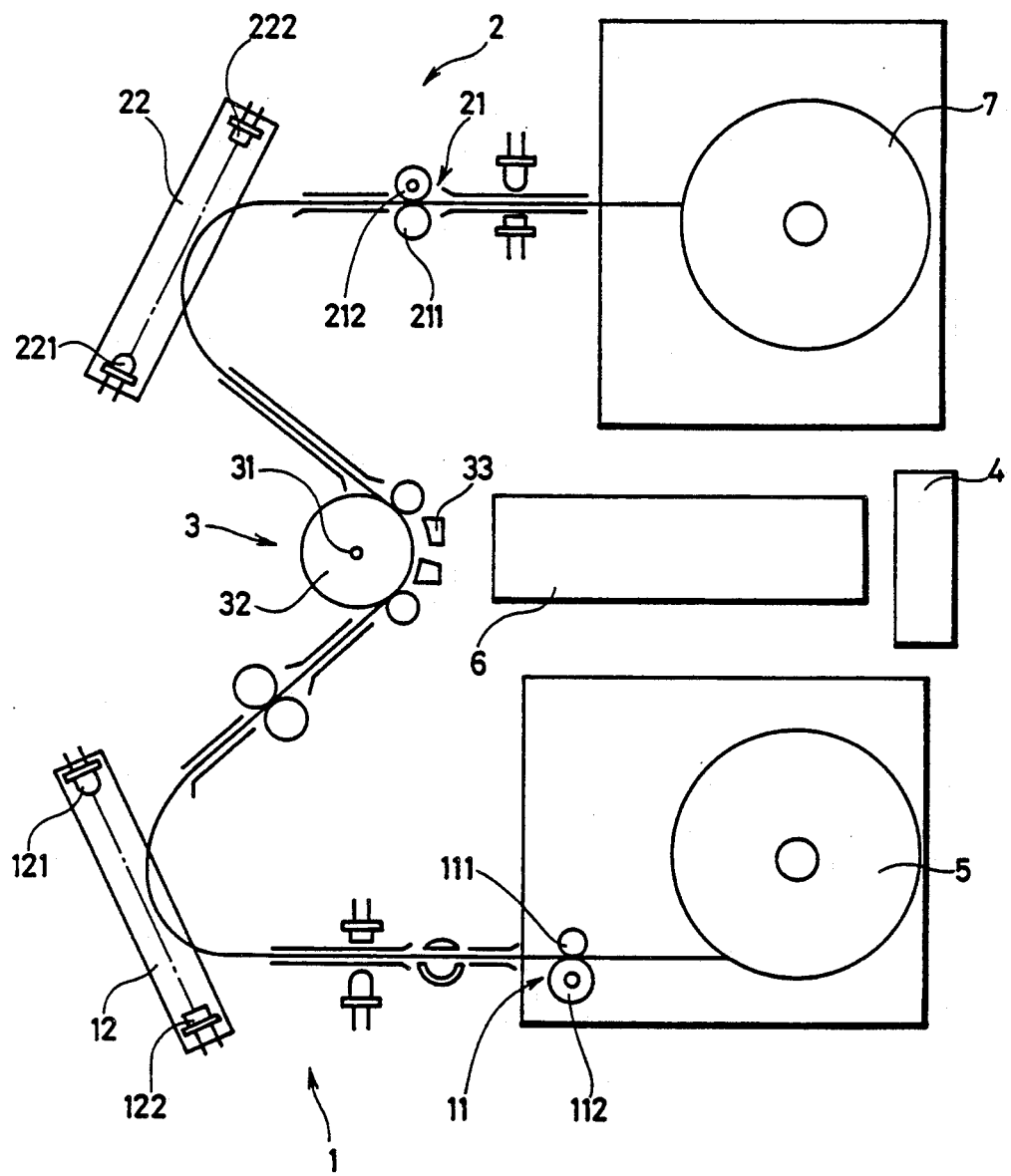
FIG. 1 shows a schematic structure of a film conveying apparatus in accordance with a first embodiment of the present invention.
Figure 2:
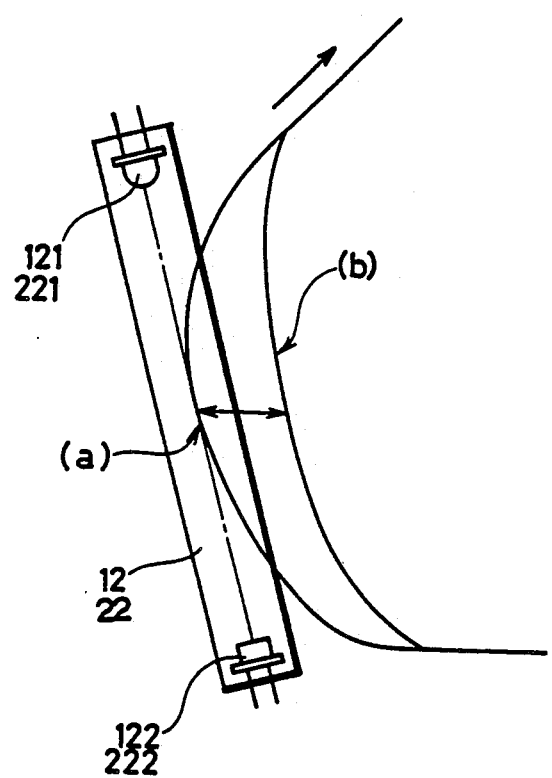
FIG. 2 is an enlarged view of the portion for detecting a slack of the film.
Figure 3:
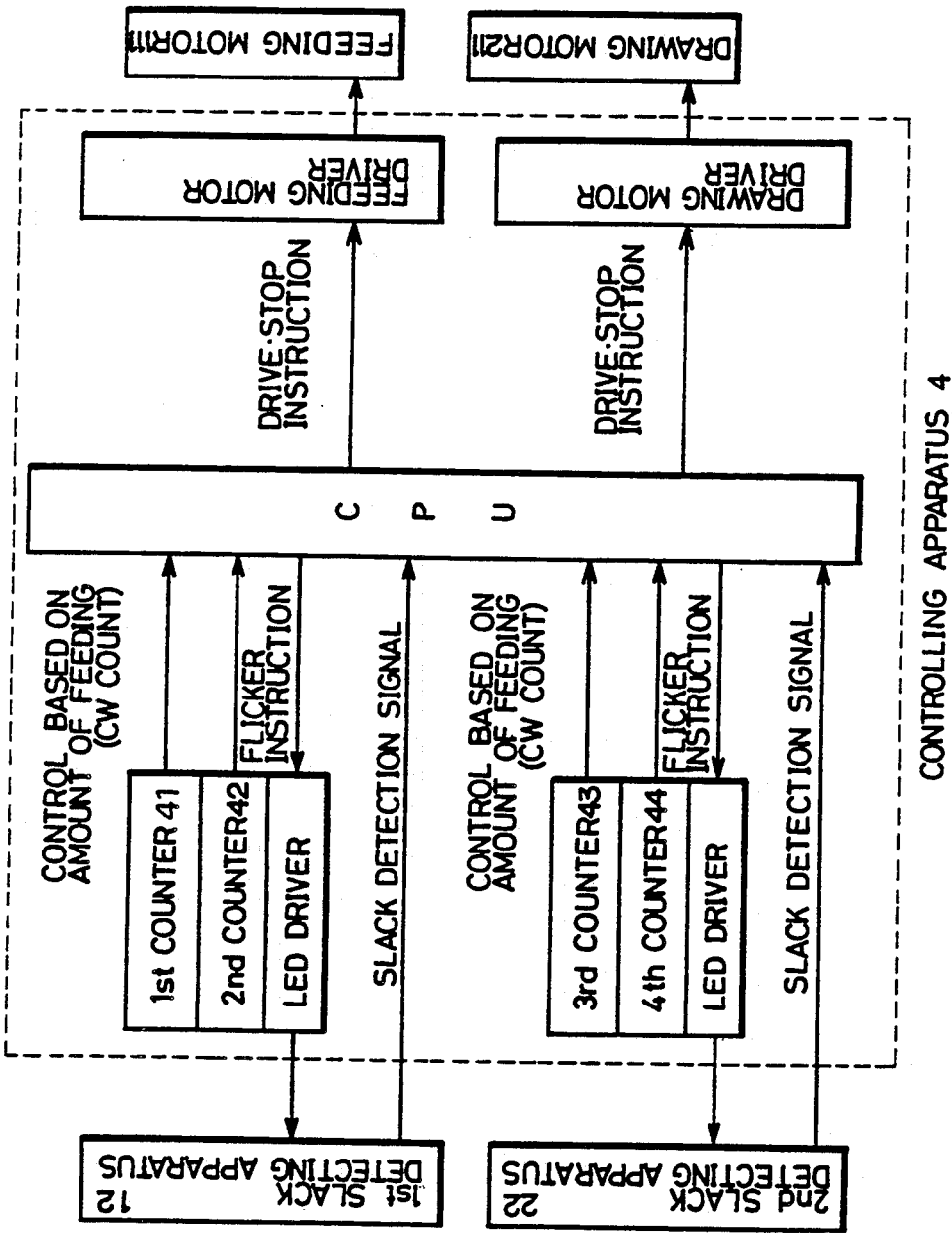
FIG. 3 is a block diagram of a controlling portion of the film conveying apparatus in accordance with the first embodiment of the present invention.

The film conveying apparatus of the first embodiment of the present invention comprises two sets of conveying apparatuses, namely, the first conveying portion 1 conveying the film fed from an unexposed film reel 5 to an optical unit 6 for image recording, and the second conveying portion 2 for feeding the film on which images are recorded to a take up reel 7, as shown in FIGS. 1 and 2.

The first conveying portion 1 comprises a film feeding portion 11, a main driving portion 3 for drawing the fed film, a first slack detecting apparatus 12 provided between the feeding portion 11 and the main driving portion 3, and a controlling apparatus 4 for controlling the operations thereof.

The second conveying portion 2 comprises a main driving portion 3 for feeding the film, a drawing portion 21 for drawing the film, a second slack detecting apparatus 22 provided between the main driving portion 3 and the drawing portion 21, and the controlling apparatus 4, which is common to the first conveying portion 1, controlling the operations thereof.

The feeding portion 11 comprises a feeding motor 111 and a feeding roller 112 provided opposing to the feeding motor 111, with the film gripped therebetween. The controlling apparatus 4 controls the driving of the feeding motor 111 feeding the film.

The main driving portion 3 comprises a main motor 31 and a main roller 32 directly coupled to the main motor 31. A stepping motor is used as the main motor 31 which is accurately driven by a scanning signal for image recording. The amount of driving is detected by counting forward direction driving pulses (CW pulses). The main roller 32 rotates as the main motor 31 is driven, and the film is accurately fed guided by a film guide 33 provided around the main roller 32. The amount of film feeding fed by the main roller 31 is exactly detected by the CW pulses.

The drawing portion 21 comprises a drawing motor 211 and a drawing roller 212 provided opposing to the drawing motor 211, with the film drawn gripped therebetween. The drawing motor 211 is controlled by the controlling apparatus 4.

The first and second slack detecting apparatuses 12 and 22 are optical detecting apparatuses for detecting maximum slack of the film based on interception of an optical path by the film, as shown in FIG. 2. The first and second slack detecting apparatuses 12 and 22 comprise light emitting diodes (LEDs) 121, 221 emitting infrared ray, and light receiving apparatuses 122 and 222 receiving the light therefrom. The LEDs 121 and 221 are both controlled by the controlling apparatus 4.

A microcomputer is used as the controlling apparatus 4, which comprises a central processing unit (CPU), an input/output controller, a LED driver circuit, motor drivers, a plurality of counters for counting the CW pulses of the main motor, and so on.

In the present embodiment, the slack detecting apparatuses 12 and 22, the feeding motor 111 and the drawing motor 211 are controlled by the controlling apparatus 4. The detecting apparatuses and the motors are controlled by three controlling portions of the controlling apparatus 4, dependent on the process of controlling.

The first controlling portion is a portion for stopping the feeding motor 111, when the maximum slack of the film is detected by the first slack detecting apparatus 12 in the first conveying portion 1, and for starting operation of the first counter 41. In the first counter 41, set is the number of CW pulses ($n_1$) calculated from the amount of driving of the main motor 31 necessary for the film slack to reach the minimum amount of slack, by the decrease of the amount of slack of the film by the drawing of the film by the main motor 31 while the feeding motor 111 is stopped.

The second controlling portion is a portion for driving the feeding motor 111 and for starting the operation of the second counter 42 when the control of the first controlling portion proceeds and the prescribed number of CW pulses ($n_1$) is counted by the first counter 41. In the second counter 42, set is the number of CW pulses ($n_2$) calculated from the amount of driving of the main motor 31 necessary for the slack of the film to reach almost the maximum amount of slack, by the increase of the slack of the film derived from the difference between the film feeding amount from feeding motor 111 and the film drawing amount by the main motor 31, when the feeding motor 111 is driven.

The third controlling portion is a portion for starting irradiation of the first slack detecting apparatus 12, when the control by the second controlling portion proceeds and the prescribed number of CW pulses ($n_2$) is counted by the second counter 42.

Similarly, in the second conveying portion 2, the first controlling portion stops irradiation by the second slack detecting apparatus 22, drives the drawing motor 211 and starts the operation of the third counter 43, when the second slack detecting apparatus 22 detects the maximum amount of slack of the film. In the third counter 43, set is the number of Cw pulses ($n_3$) calculated based on the amount of driving of the main motor 31 which is necessary for the slack of the film to reach the minimum amount of slack, by the decrease of the slack of the film derived from the difference between the film feeding amount by the main motor 31 and the film drawing amount by the drawing motor 211, when the drawing motor 211 is driven.

The second controlling portion stops the drawing motor 211 and starts the operation of the fourth counter 44, when the control by the first controlling portion is done and the prescribed number of CW pulses ($n_3$) is counted by the third counter 43.

In the fourth counter 44, set is the number of CW pulses ($n_4$) calculated based on the amount of driving of the main motor 31 necessary for the slack of the film to reach almost the maximum amount of slack, by the increase of the slack of the film by the film feeding by the main motor 31, when the drawing motor 211 is stopped.

The third controlling portion is to start irradiation of the second slack detecting apparatus 22, when the control by the second controlling portion proceeds and the prescribed number of the CW pulses ($n_4$) is counted by the fourth counter 44.

Such control is carried out by the controlling apparatus 4 which is common to the first conveying portion 1. In the control of the feeding motor 111 and the drawing motor 211, operation of the main motor 31 controlled by the scanning signals for image recording is given priority. Control corresponding thereto is carried out, and then control of film slack by the feeding motor 111 and the drawing motor 211 is carried out.

Figure 4:
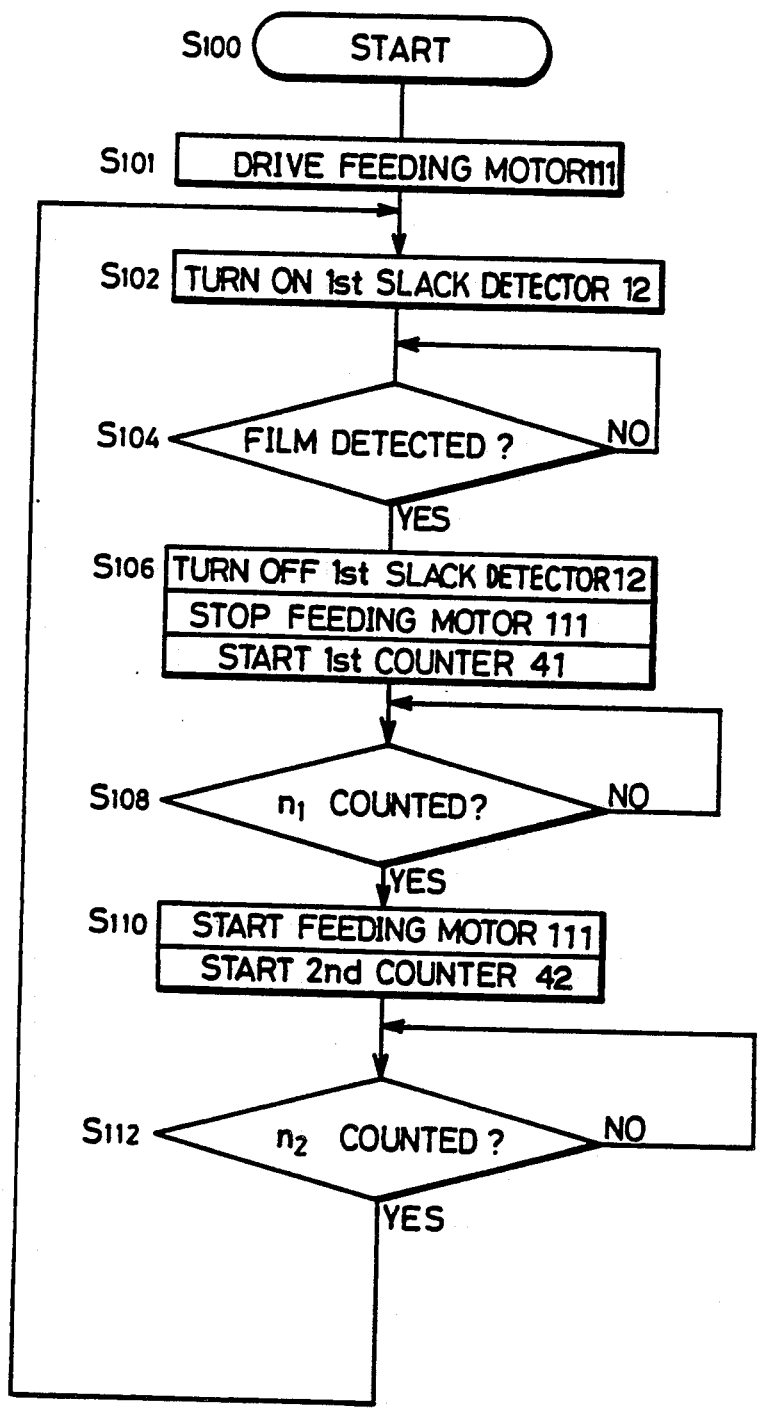
FIGS. 4 and 5 are flow charts showing the contents of control of the film conveying apparatus in accordance with the first embodiment of the present invention.
Figure 5:
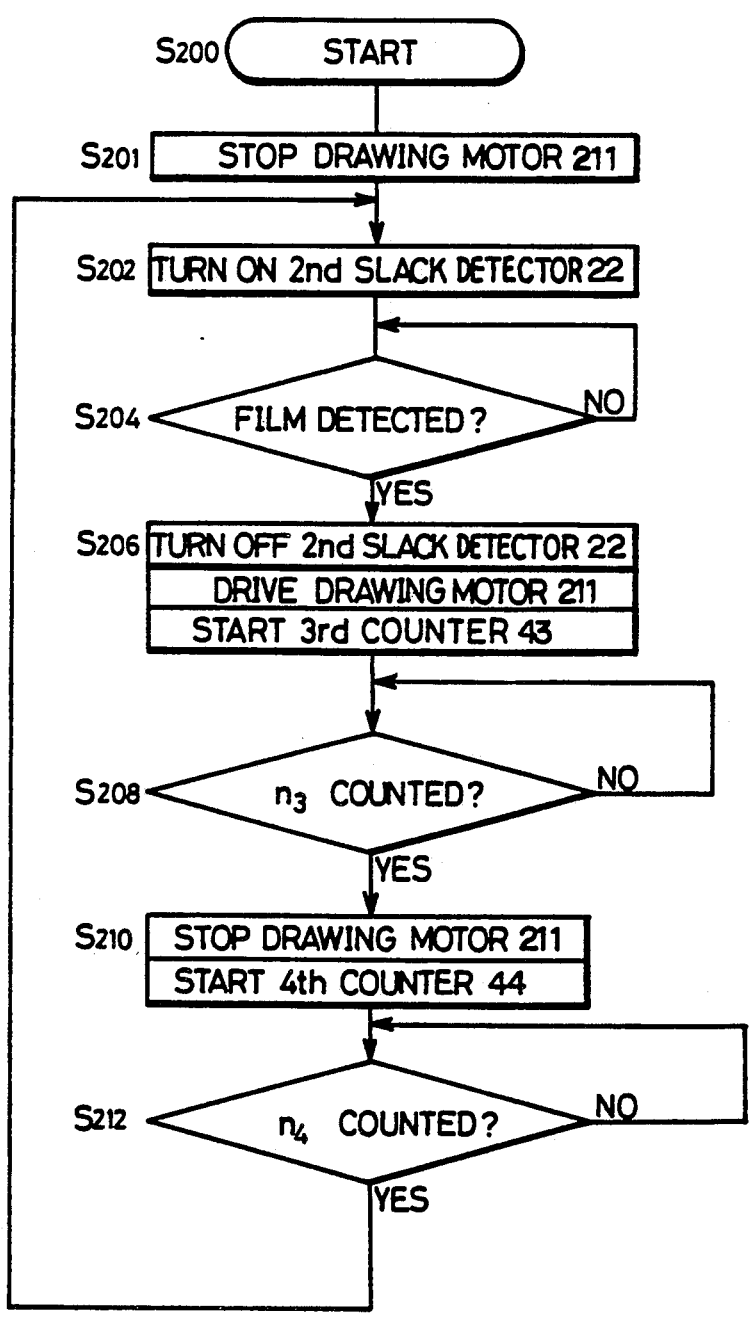

The details of the control of the film conveying apparatus in the present embodiment will be described with reference to FIGS. 4 and 5.

First, when the power is turned on, the LEDs 121 and 211 of the first and second slack detecting apparatuses 12 and 22, respectively, are turned on to detect the slack of the film. The control corresponding to the detected slack is started in the following manner.

The control in the first conveying portion 1 will be described at first, referring to FIG. 4. There are two cases as the initial states of the slack of the film when the power is turned on. One is the case in which the maximum slack is detected by the first slack detecting apparatus 12 (the state (a) of FIG. 2), and the other is the case in which there is no slack detected (the state (b) of FIG. 2).

The power is turned on in the step 100, and the film conveying apparatus starts its operation. Thereafter, the feeding motor 111 is driven in the step 101, and then the LED of the first slack detecting apparatus 12 is turned on to start irradiation in the step 102. The state of film slack at this time is detected in the step 104. If the film is detected, it means that the slack of the film has reached the maximum amount, and the control proceeds to the step 106. The feeding motor 111 is driven even when the maximum amount of slack is reached at the time of power on, however, since the time required from the step 100 to 106 is only a moment, the amount of film fed during this period may be regarded as 0.

In the step 106, irradiation by the first slack detecting apparatus 12 is stopped, and the driving of the feeding motor 111 is stopped so that the speed of drawing of the main motor 31, which is the drawing means in the first conveying portion 1 is made equal to or faster than the speed of feeding of the feeding motor 111. At approximately the same time, the fist counter 41 is started to count the CW pulses of the main motor 31. The control of the steps 104 and 106 are carried out in the first controlling portion described above.

In the step 108, whether or not the value of the first counter 41 whose operation is started in the step 106 has reached the prescribed count number ($n_1$) at the time of stop of the feeding motor 111 or not is determined. If the first counter 41 counting the CW pulses of the main motor 31 reaches the prescribed count number ($n_1$), the program proceeds to the step 110.

In the step 110, the feeding motor 111 which has been stopped is started and the second counter 42 is started to count the CW pulses of the main motor 31. Since the feeding speed by the feeding motor 111 is faster than the drawing speed by the main motor 31, the amount of slack of the film increases corresponding to the relative speed. The control from the steps 108 to the step 110 is done by the second controlling portion.

In the step 112, it is determined whether or not the count of the second counter 42 whose operation is started in the step 110 has reached the prescribed count number ($n_2$), with the feeding motor 111 being driven. If the count of the second counter 42 reaches the prescribed count number ($n_2$), the program proceeds to the step 102 to form a loop.

Thereafter, control is carried out in accordance with this loop.

Meanwhile, at the step 104 directly after the power on, if the film is not detected when the film slack is checked by the first slack detecting apparatus 12, the feeding motor 111 is continuously driven, and after the film is detected, the control proceeds to the step 106 and to the following steps described above.

The control of the second conveying portion 2 will be described with reference to FIG. 5, mainly focused on differences over the first conveying portion 1.

The second conveying portion 2 corresponds to the first conveying portion 1 as follows.

The first slack detecting apparatus 12 of the first conveying portion 1 corresponds to the second slack detecting apparatus 22 of the second conveying portion, the feeding motor 111 of the first conveying portion corresponds to the main motor 31 of the second conveying portion 2, and the main motor 31 of the first conveying portion 1 corresponds to the drawing motor 211 of the second conveying portion 2. The controlling apparatus 4 is common to both portions.

The power is turned on in the step 200, and the operation starts simultaneously with the first conveying portion 1. After the operation is started, the first conveying portion 1 and the second conveying portion 2 are controlled independently. After the start of operation, the drawing motor 211 is stopped in the step 201, and the LED of the second slack detecting apparatus 2 is turned on in the step 202 to start irradiation. The state of slack of the film at this time is detected in the step 204. If the film is detected, it means that the slack of the film has reached the maximum slack, and the control proceeds to the step 206.

In the step 206, irradiation by the second slack detecting apparatus 22 is stopped and the drawing motor 211 is driven to reduce the slack of the film. The third counter 43 is started to count the CW pulses of the main motor 31.

In the step 208, whether or not the count of the third counter 43 started in the step 206 has reached the prescribed count number ($n_3$) at the time of driving of the drawing motor 211 is determined. If the count of the third counter 43 reaches the prescribed count number ($n_3$), the program proceeds to the step 210.

In the step 210, the drawing motor 211 which has been driven is stopped and the operation of the fourth counter 44 is started to newly count the CW pulses of the main motor 31. In the next step 212, whether or not the count of the first counter 44 started in the step 210 has reached the prescribed count number ($n_4$) at the time of stop of the driving motor 211 is determined. If the count of the first counter 44 reaches the prescribed count number ($n_4$), the flow returns to the step 202 to form a large loop.

The control moves to the step 202 in which the second slack detecting apparatus 22 is turned on. Thereafter, the control proceeds in accordance with this loop.

Meanwhile, in the step 204 directly after the power on, if the film is not detected when the slack of the film is checked by the slack detecting apparatus 22, the program returns to the step 204 to form a small loop. In this manner, the loop is repeated until the film is detected by the second slack detecting apparatus 22, and when the film is detected, the control moves to the step 206 and following steps described above.

In the present embodiment, control is carried out by calculating increase/decrease of the amount of slack of the film, by counting the CW pulses of the main motor by the counters 41 to 44. However, if the rate of increase/decrease of the slack amount of the film is constant, control may be carried out by using a timer. In the present invention, control for scanning for image recording is given priority in order to prevent influence of the main motor 31 to the image recording. Therefore, drive control of the main motor 31 for adjusting slack of the film is not carried out. It goes without saying that the driving of the main motor 31 may be controlled to adjust the slack of the film.

(2) Second embodiment

The second embodiment of the present invention will be described in the following. In the second embodiment of the present invention, first and second slack detecting apparatuses 12 and 22 have a plurality of detecting portions, respectively. In the second embodiment, adjustment of increase/decrease of the slack amount of the film is carried out by using a timer. Since the second embodiment is the same as the first embodiment except the above described portions, the same portions are denoted by the same reference numerals and the description thereof is not repeated. In the following, only the differences will be described.

Figure 6:
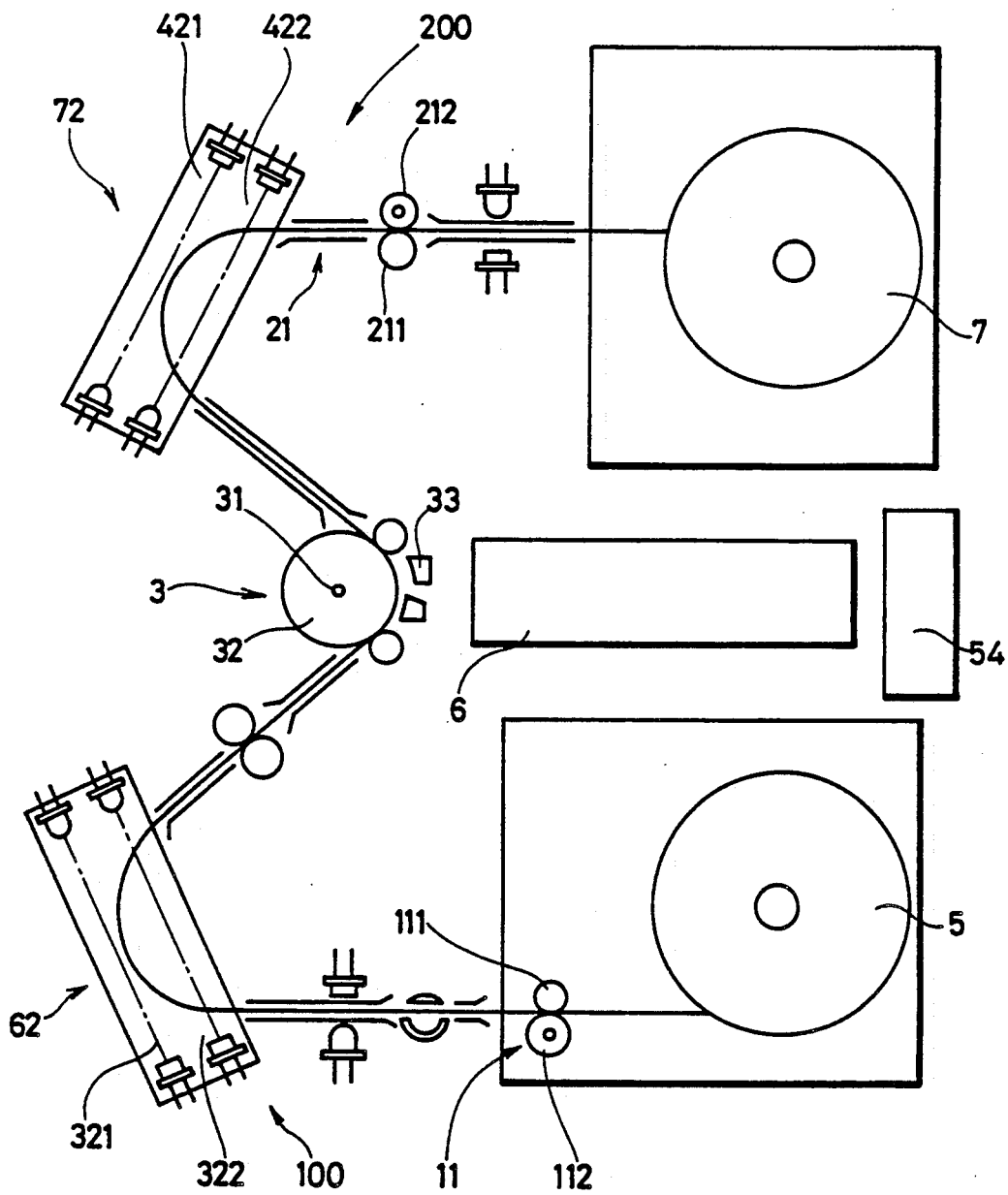
FIG. 6 shows a schematic structure of a film conveying apparatus in accordance with a second embodiment of the present invention.
Figure 7:
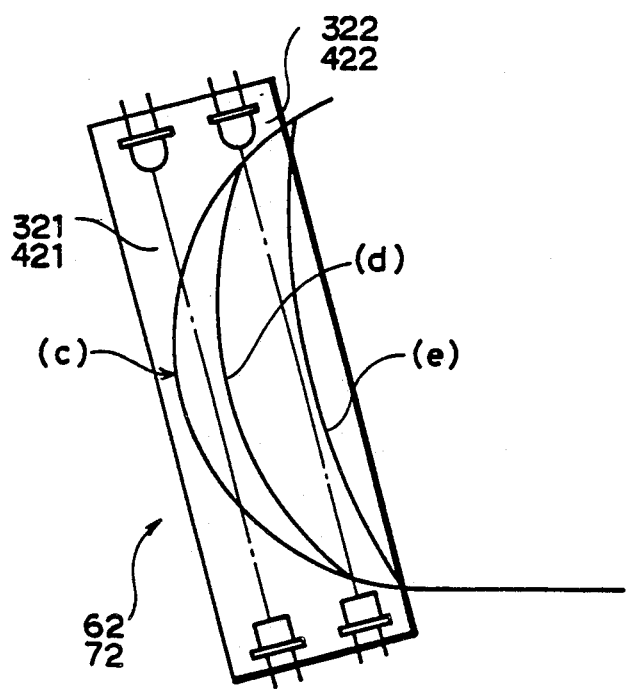
FIG. 7 is an enlarged view of the portion for detecting slack of the film in the second embodiment.

Referring to FIGS. 6 and 7, the first and second slack detecting apparatuses 62 and 72 in accordance with the second embodiment of the present invention will be described. In the second embodiment, the film conveying apparatus comprises a first conveying portion 100 and a second conveying portion 200.

The first and second slack detecting apparatuses 62 and 72 are both optical detecting apparatuses having a first maximum slack detecting portion 321, a second maximum slack detecting portion 421 for detecting the maximum slack of the film by the interception of an optical path, and a first minimum slack detecting portion 322 and the second minimum slack detecting portion 422 for detecting the minimum slack of the film by connection of the intercepted optical path. These comprise light emitting diodes (LED's) which are the light emitting apparatuses, and light receiving apparatuses. As in the first embodiment, the LEDs are controlled by a controlling apparatus 54.

The controlling portion 54 is divided into the following four controlling portions in the process of controlling.

Figure 8:
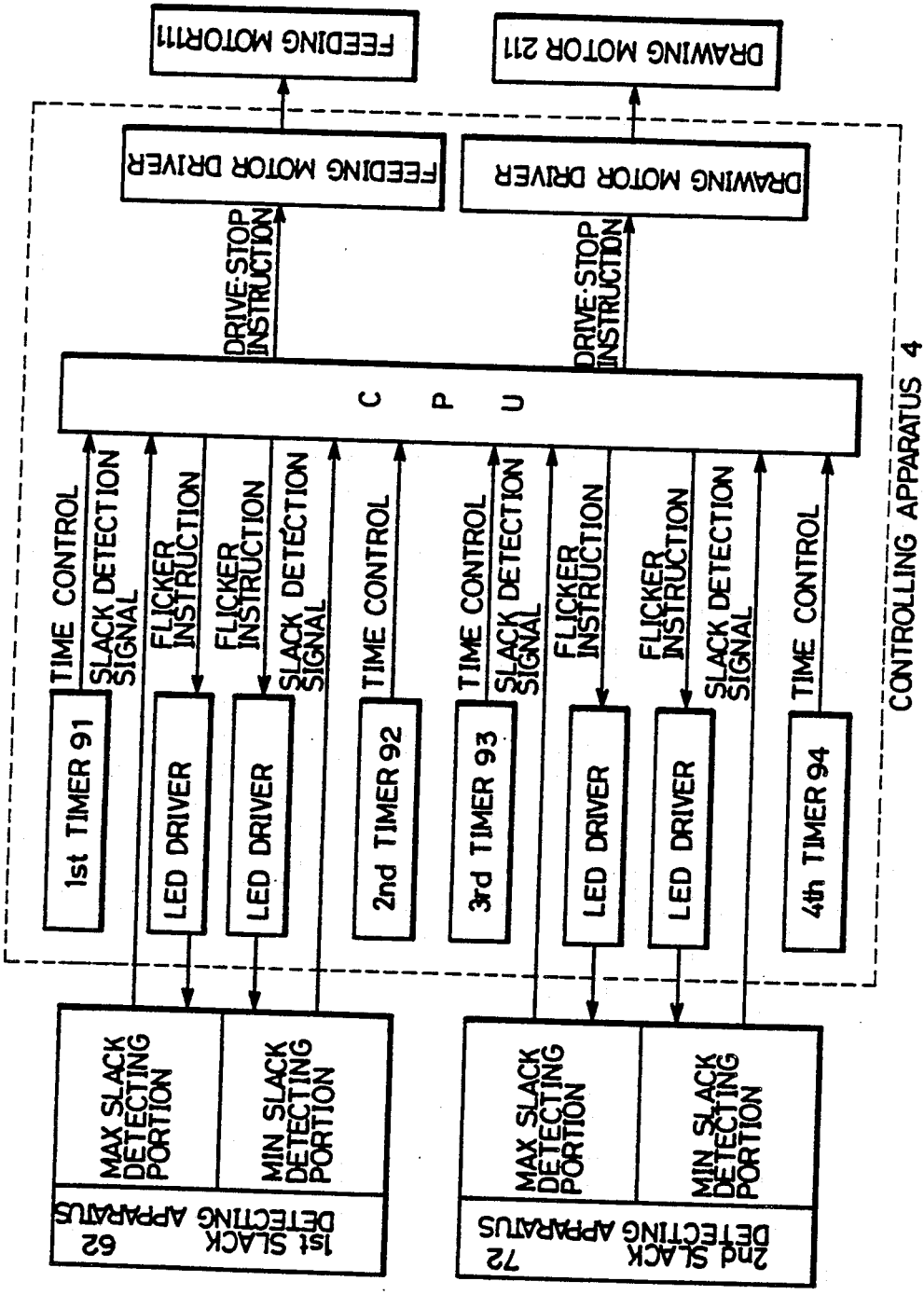
FIG. 8 is a block diagram of the controlling portion of the film conveying apparatus in accordance with the second embodiment of the present invention.

In the control of this embodiment, the slack detecting apparatuses 62 and 72, the feeding motor 111 and the drawing motor 211 are controlled by the respective controlling portions of the controlling apparatus 54 as will be described in the following, referring to FIG. 8.

In the first conveying portion 100, the first controlling portion stops the feeding motor 111 and starts a first timer 91. In the first timer 91, set is the time required for the reduction of the slack of the film from the maximum slack to almost the minimum amount of slack, by the drawing of the film by the main motor 31, when the feeding motor 111 is stopped.

The second controlling portion is to start irradiation of the first minimum slack detecting portion 32 in accordance with the time control by the first timer 91.

The third controlling portion is to start the second timer 92. In the second timer 92 set is the time required for the increase of the film from the minimum slack to almost the maximum slack, by the relative speed of drawing by the main motor 31 and the speed of feeding of the feeding motor 111.

The fourth controlling portion is to start irradiation of the first maximum slack detecting portion 321 in accordance with the time control of the second timer 92.

In the fourth conveying portion 2, the first controlling portion starts the operation of a third timer 93. In the third timer 93 set is the time required for the reduction of the film slack from the maximum slack to almost the minimum slack, by the relative speed of feeding of the feeding motor 211 and the feeding speed of the main motor 31.

The second controlling portion is to start irradiation by the second minimum slack detecting portion 422 in accordance with the time control by the third timer 93.

The third controlling portion is to start a fourth timer 94. In the fourth timer 94, set is the time required for the increase of the film slack from the minimum slack to almost the maximum slack, by the feeding of the film by the main motor 31 while the drawing motor 211 is stopped. The fourth controlling portion is to start irradiation by the second maximum slack detecting portion 421 by the time control of the fourth timer 94.

Figure 9:
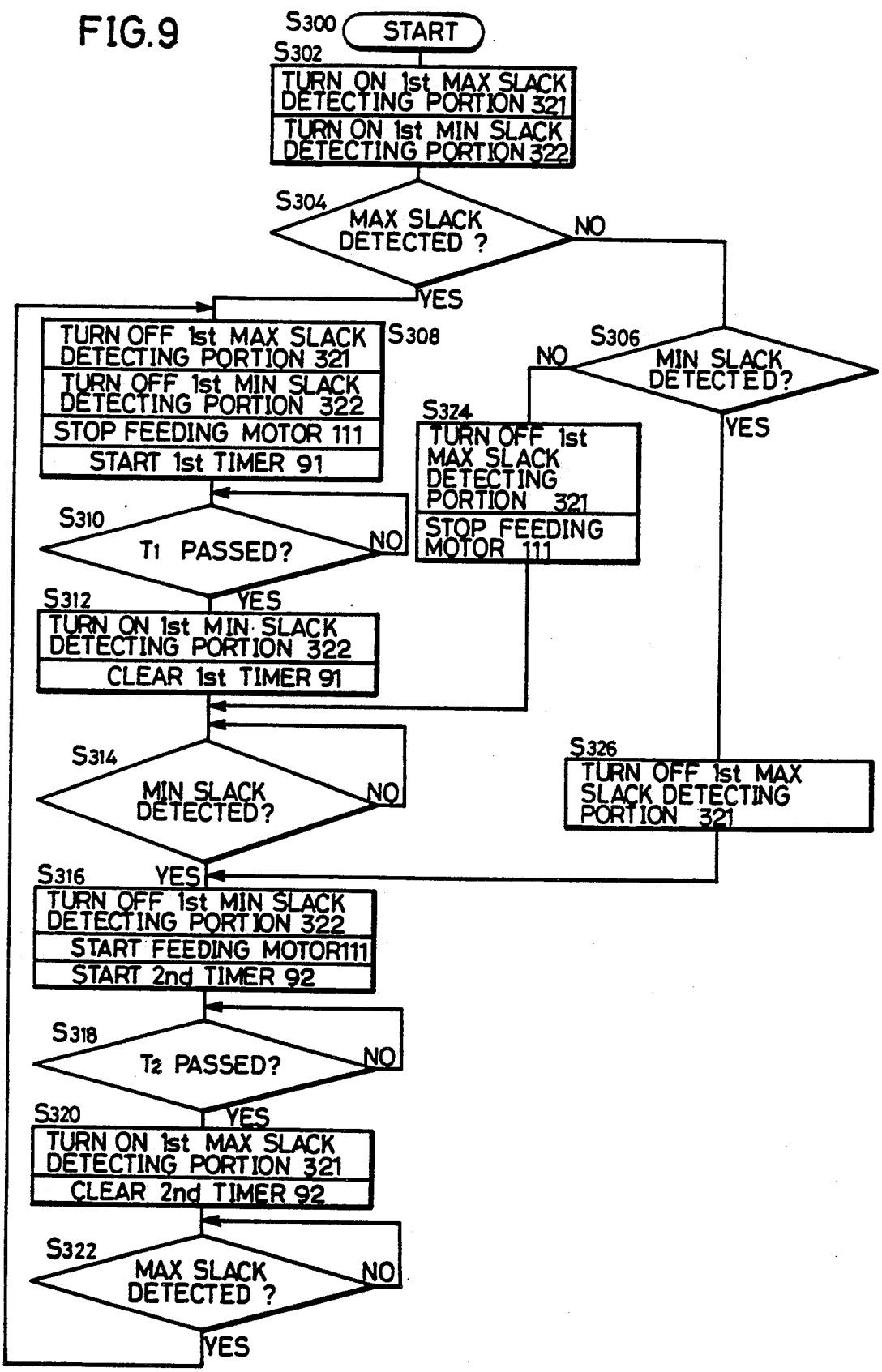
FIGS. 9 and 10 are flow charts showing contents of control of the film conveying apparatus in accordance with the second embodiment of the present invention.
Figure 10:
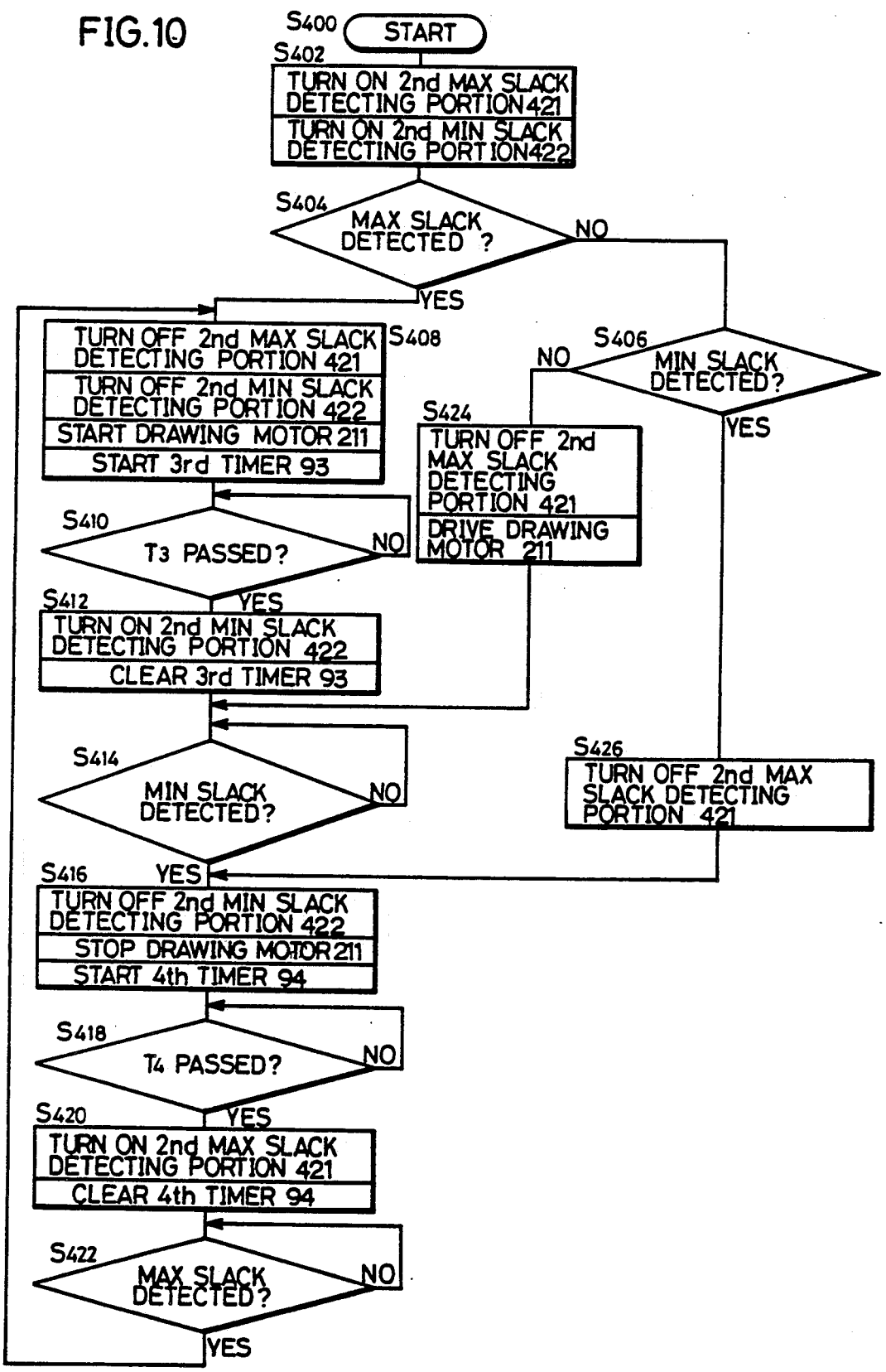

The operation of the film conveying apparatus in the second embodiment will be described with reference to the flow charts shown in FIGS. 9 and 10.

When the power is turned on at first, the LEDs of the first and second slack detecting apparatuses 62 and 72 are turned on to detect the state of slack of the film. Control corresponding to the detected state is started.

The first conveying portion 1 will be described at first with reference to FIG. 9. There may be three initial states of the film slack at the time of power on. First is the state in which the maximum slack is detected by the maximum slack detecting portions 321 (the state (a) of FIG. 7) and others are the states in which the maximum slack is not detected, that is, in one state, the minimum slack is detected by the first minimum slack detecting portions 322 (the state (c) of FIG. 7), and the remaining one is the state in which it is not detected (the state (b) of FIG. 7).

The power is turned on in the step 300, and the film conveying apparatus starts its operation. Thereafter, LEDs for detecting maximum and minimum slacks of the first slack detecting apparatus 62 are turned on to start irradiation. The slack of the film at this time is detected in the steps 304 and 306. If the film is detected at the first maximum slack detecting portion 321, it means that the slack of the film has reached the maximum slack, and the control proceeds to the step 308.

In the step 308, irradiation of the first maximum slack detecting portion 321 and of the first minimum slack detecting portion 322 is stopped and the driving of the feeding motor 111 is stopped, whereby the drawing speed of the main motor 31 serving as the drawing means in the first conveying portion 1 is made equal to or faster than the feeding speed of the feeding motor 111. The first motor 91 in the controlling apparatus 4 starts its operation. The control of the steps 304 and 308 are carried out in the first controlling portion.

In the step 310, whether or not the value of the first timer 91, whose operation was started in step 308, has reached the prescribed time period $T_1$ with the feeding motor 111 stopped is determined. The prescribed time $t_1$ corresponds to the time required for the slack of the film which is decreased by the drawing by the main motor 31 with the feeding motor 111 being stopped to reach the allowable maximum slack. If the count of the first timer 91 reaches the prescribed time $t_1$, the flow proceeds to the step 312.

In the step 312, the first minimum slack detecting portion 322 is turned on and the first timer 91 is cleared.

The control from the steps 310 to 312 is done by the second controlling portion. In the next step 314, the minimum slack of the film is detected. If the minimum slack is detected in the step 314, the control proceeds to the step 316.

In the step 316, the first minimum slack detecting portion 172 is turned off, the feeding motor 111 which has been stopped is operated, and the counting by the second timer 92 is started. Since the speed of drawing by the main motor 81 is slower than the feeding speed of the feeding motor 111, the amount of slack of the film increases corresponding to the relative speed. The control from the step 314 to the step 316 is carried out by the third controlling portion.

In the step 318, whether or not the count of the second timer 92 whose operation was started in the step 316 has reached the prescribed time $T_2$ with the feeding motor 111 being driven is determined. Since the difference between the amount of feeding of the film and the amount of drawing by the main motor 31 corresponds to the amount of increase of the film slack, as the feeding motor 111 is driven, the time required for the film slack to reach the maximum slack amount is calculated based on the amount of increase. The prescribed time $T_2$ while the feeding motor 111 is driven corresponds to that time. If the count of the second timer 92 has reached the prescribed time $T_2$, the control proceeds to the step 320. In the step 320, the first maximum slack detecting portion 321 is turned on again, and the second timer 92 is cleared. In the next step 322, when the film maximum slack is detected by the first maximum slack detecting portion 321, the control returns to the step 308 to form a large loop. The control to this step is done by the fourth control portion.

Thereafter, the control is carried out in accordance with this loop.

Meanwhile, in the step 304 immediately after the power on, if neither the maximum slack nor the minimum slack is detected when the film slack is checked by the first slack detecting apparatus 62, the control branches to the step 324. In the step 324, the first maximum slack detecting portion 321 is turned on and the feeding motor 111 is stopped. The control proceeds to 314.

If the minimum slack is detected in the steps 306, the control proceeds to the step 326. In the step 326, the first maximum slack detecting portion 321 is turned off and the control proceeds to the step 314 to be continued.

The control of the second conveying portion 200 different from that of the first conveying portion 100 will be described in the following with reference to FIG. 10.

In the step 400, the power is turned on and the operation is started simultaneously with the first conveying portion 100. After the power on, LEDs for detecting the maximum and the minimum slacks of the second slack detecting apparatus 72 are turned on to start irradiation in the step 402. The state of slack of the film at this time is detected in the steps 404 and 406. If the film is detected in the second maximum slack detecting portion 421, it means that the slack of the film has reached the maximum slack, and the control proceeds to the step 408.

In the step 408, irradiation by the second maximum slack detecting portion 421 and by the second minimum slack detecting portion 422 are stopped and the drawing motor 211 is driven to decrease the slack amount of the film. The counting of the third timer 93 is started.

In the step 410, whether or not the count of the third timer 93 started in the step 408 has reached the prescribed time $T_3$ while the drawing motor 211 is driven is determined. If the count of the third timer 93 reaches the prescribed time $T_3$, the control proceeds to the step 412.

In the step 412, the second maximum slack detecting portion 422 is turned on and the third timer 93 is cleared. In the next step 414, the minimum slack of the film is detected and the control proceeds to the step 416.

In the step 416, the second minimum slack detecting portion 422 is turned off, the drawing motor 411 which has been driven is stopped and the counting of the fourth timer 94 is started. In the next step 418, whether or not the count of the fourth time 94 started in the step 416 has reached the prescribed time $T_4$ while the drawing motor 211 is stopped is determined. If the count of the fourth timer 94 reaches the prescribed time $T_4$, the control proceeds to the step 420.

In the step 420, the second maximum slack detecting portion 421 is turned on again and the fourth timer 94 is cleared. In the next step 422, the maximum slack of the film is detected, and the control proceeds to the step 408 to form a large loop.

Thereafter, the control is carried out in accordance with this loop.

Meanwhile, in the step 404 immediately after the power on, if neither the maximum slack nor the minimum slack is detected when the second slack detecting apparatus 72 checks the slack of the film, the control branches to the step 424. In the step 424, the second maximum slack detecting portion 421 is turned off and the drawing motor 411 is driven. The control proceeds to 414.

If the minimum slack is detected in the step 426, the control proceeds to the step 426 in which the second maximum slack detecting portion 421 is turned off and the control proceeds to the step 416.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A film conveying apparatus, comprising:
film feeding means for feeding a film;
film drawing means for drawing said fed film;
slack detecting means including a light emitting element and a light receiving element for optically detecting slack of said film formed between said film feeding means and said film drawing means; and
controlling means for stopping, when said slack detecting means detects slack of said film, emission of light from said light emitting element for a prescribed time period.

2. A film conveying apparatus, comprising:
film feeding means for feeding a film;
film drawing means for drawing said fed film;
slack detecting means including a light emitting element and a light receiving element for optically detecting an amount of slack of said film formed between said film feeding means and said film drawing means;
first controlling means for stopping, when said slack detecting means detects a prescribed amount of slack, emission of light from said light emitting element and making speed of drawing of said film drawing means equal to or faster than speed of feeding of said feeding means;
second controlling means for making the drawing speed of said film drawing means equal to or slower than the feeding speed of said feeding means, after control by said first controlling means is done for a prescribed time period; and
third controlling means for starting, after the control of said second controlling means, emission of light from said light emitting element.

3. An apparatus according to claim 2, wherein said film is a photosensitive film.

4. An apparatus according to claim 2, wherein said film feeding means feeds said film at a prescribed feeding speed, said film drawing means draws said film at a prescribed drawing speed, and
at least one of said feeding speed and drawing speed is controlled to be constant.

5. An apparatus according to claim 2, wherein said film feeding means and said film drawing means are both provided on same side of a line coupling the light emitting element and the light receiving element.

6. A film conveying apparatus, comprising:
film feeding means for feeding a film;
film drawing means for drawing said fed film;
first slack detecting means including a light emitting element and a light receiving element for detecting maximum amount of slack of said film formed between said film feeding means and said film drawing means;
second slack detecting means including a light emitting element and a light receiving element for detecting minimum amount of slack of said film formed between said film feeding means and said film drawing means;

first controlling means for stopping, when the maximum amount of slack is detected by said first slack detecting means, emission of light of the light emitting element of said first slack detecting means and for making speed of drawing of said film drawing means equal to or faster than feeding speed of said feeding means;

second controlling means for starting emission of light from said light emitting element of said second slack detecting means, after control by said first controlling means is done for a prescribed time period;

third controlling means for stopping, when said minimum amount of slack is detected by said second slack detecting means, emission of light from the light emitting element of said second slack detecting means and for making the drawing speed of said film drawing means equal to or faster than the feeding speed of said feeding means; and fourth controlling means for starting emission of light of said light emitting element of said first slack detecting means, after the control by said third controlling means.

7. An apparatus according to claim 6, wherein said maximum amount of slack is defined as an amount of slack of the film when the light receiving element is changed from a state in which light emitted from the light emitting element is received to a state in which the light is not received as the light is intercepted by said film; and said minimum amount of slack is defined as an amount of slack of the film when the light receiving element is changed from a state in which the light is not received as the light emitted from the light emitting element is intercepted by said film to a state in which the light receiving element receives the light.

8. An apparatus according to claim 7, wherein said film is a photosensitive film.

9. A film conveying apparatus, comprising:
film feeding means for feeding a film;
film drawing means for drawing said fed film;
slack detecting means including a light emitting element and a light receiving element for optically detecting maximum and minimum amounts of slack of said film:

first controlling means for stopping, when the maximum amount of slack is detected by said slack detecting means, emission of light of the light emitting element and for making speed of drawing of said film drawing means equal to or faster than feeding speed of said feeding means;

second controlling means for starting emission of light from said light emitting element, after control by said first controlling means is done for a prescribed time period;

third controlling means for stopping, when said minimum amount of slack is detected by said slack detecting means, emission of light from the light emitting element and for making the drawing speed of said film drawing means equal to or slower than the feeding speed of said feeding means; and fourth controlling means for starting emission of light of said light emitting element, after the control by said third controlling means.

10. An apparatus according to claim 9, wherein said film is a photosensitive film.

11. An apparatus according to claim 9, wherein said film feeding means feeds said film at a prescribed feeding speed, said film drawing means draws said film at a prescribed drawing speed, and at least one of said feeding speed and drawing speed is controlled to be constant.

12. A method of conveying a film with slack between two points, comprising the steps of:
increasing slack of said film;
detecting an amount of said increased slack of said film;
stopping the detection of said increased slack of said film when said slack reaches a predetermined value; and
decreasing said slack of said film.

13. A method of conveying a film with slack between two points, comprising the steps of:
(a) increasing slack of said film;
(b) detecting an amount of said increased slack of said film;
(c) stopping the detection of said increased slack of said film when said slack reaches a predetermined value;
(d) decreasing said slack of said film;
(e) starting said detection of said slack of said film; and
said steps of (a) to (e) being executed repeatedly.

14. A method of conveying a film with an amount of slack of the film kept at a prescribed amount by making the film slack between two points and by detecting the amount of slack by using optical means, comprising the steps of;
increasing speed of feeding of said film;
detecting maximum amount of slack of said film;
stopping emission of light from said optical means; and
decreasing the speed of feeding said film.

15. A method according to claim 14, further comprising the steps of:
increasing said feeding speed again, after said film is fed for a prescribed time period by the decreased feeding speed; and
starting emission of light from said optical means.

* * * * *